Sept. 12, 1933.　　　D. KELLEHER　　　1,926,048
WORK HANDLING MECHANISM
Filed March 25, 1929　　6 Sheets-Sheet 1
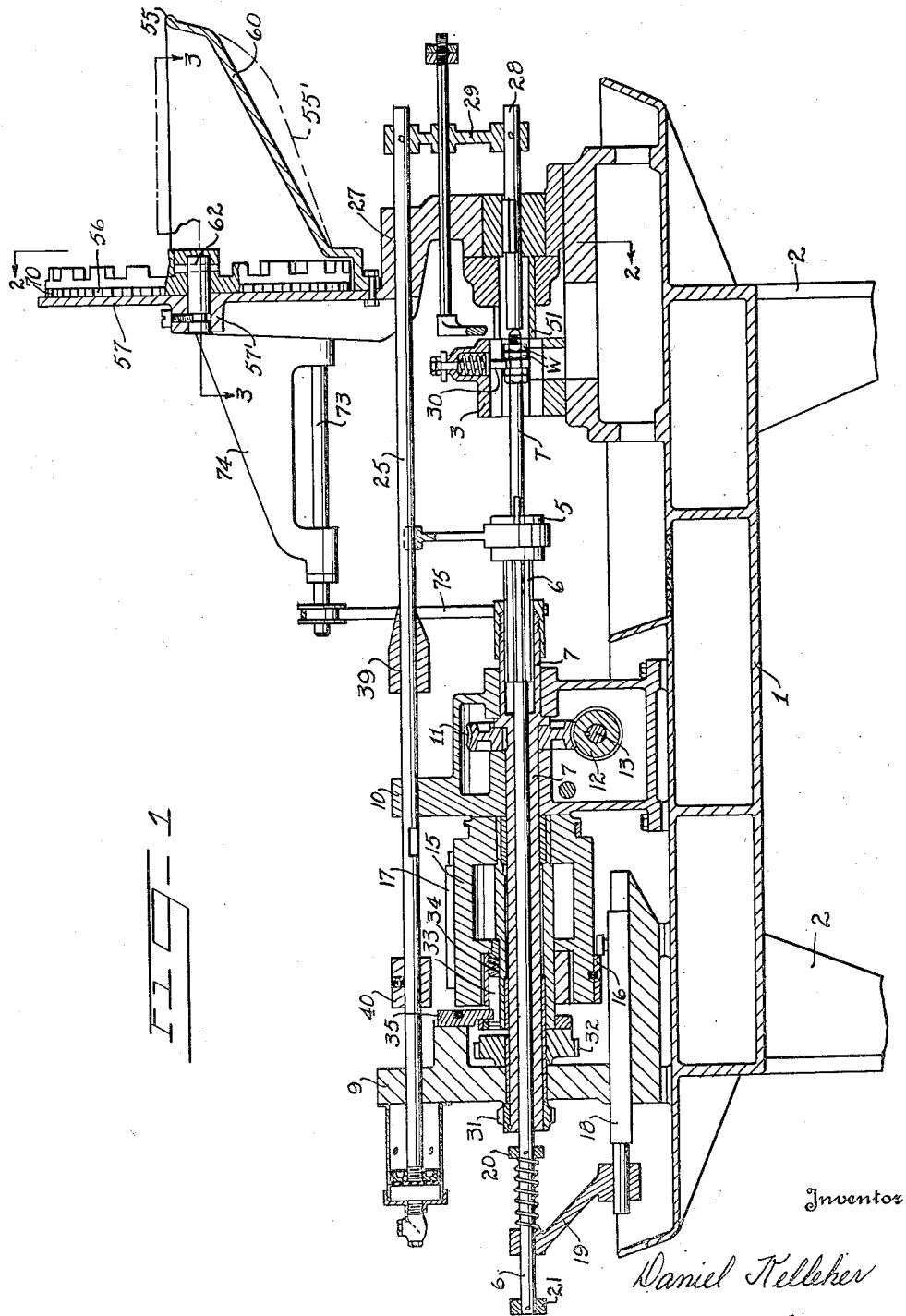
Inventor
Daniel Kelleher
By Bates, Golrick & Teare
Attorneys

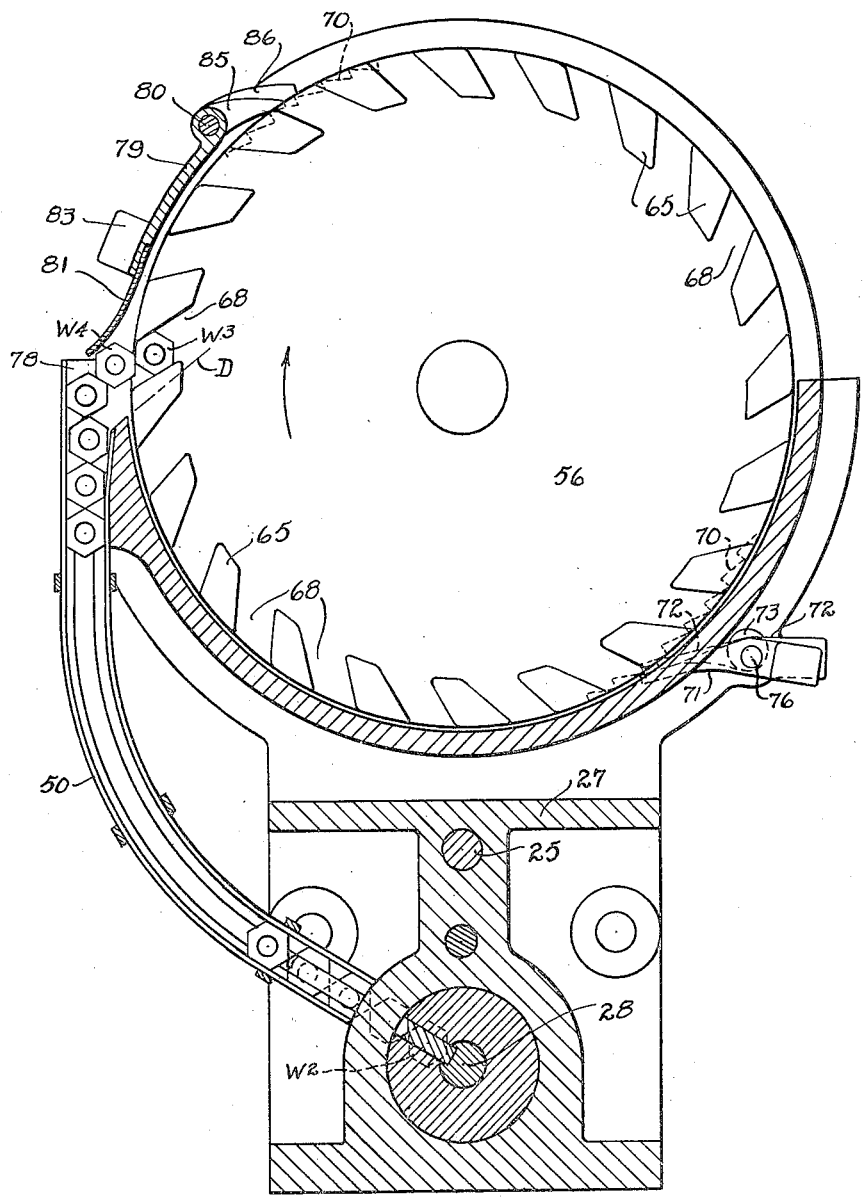

Sept. 12, 1933.    D. KELLEHER    1,926,048
WORK HANDLING MECHANISM
Filed March 25, 1929    6 Sheets-Sheet 3
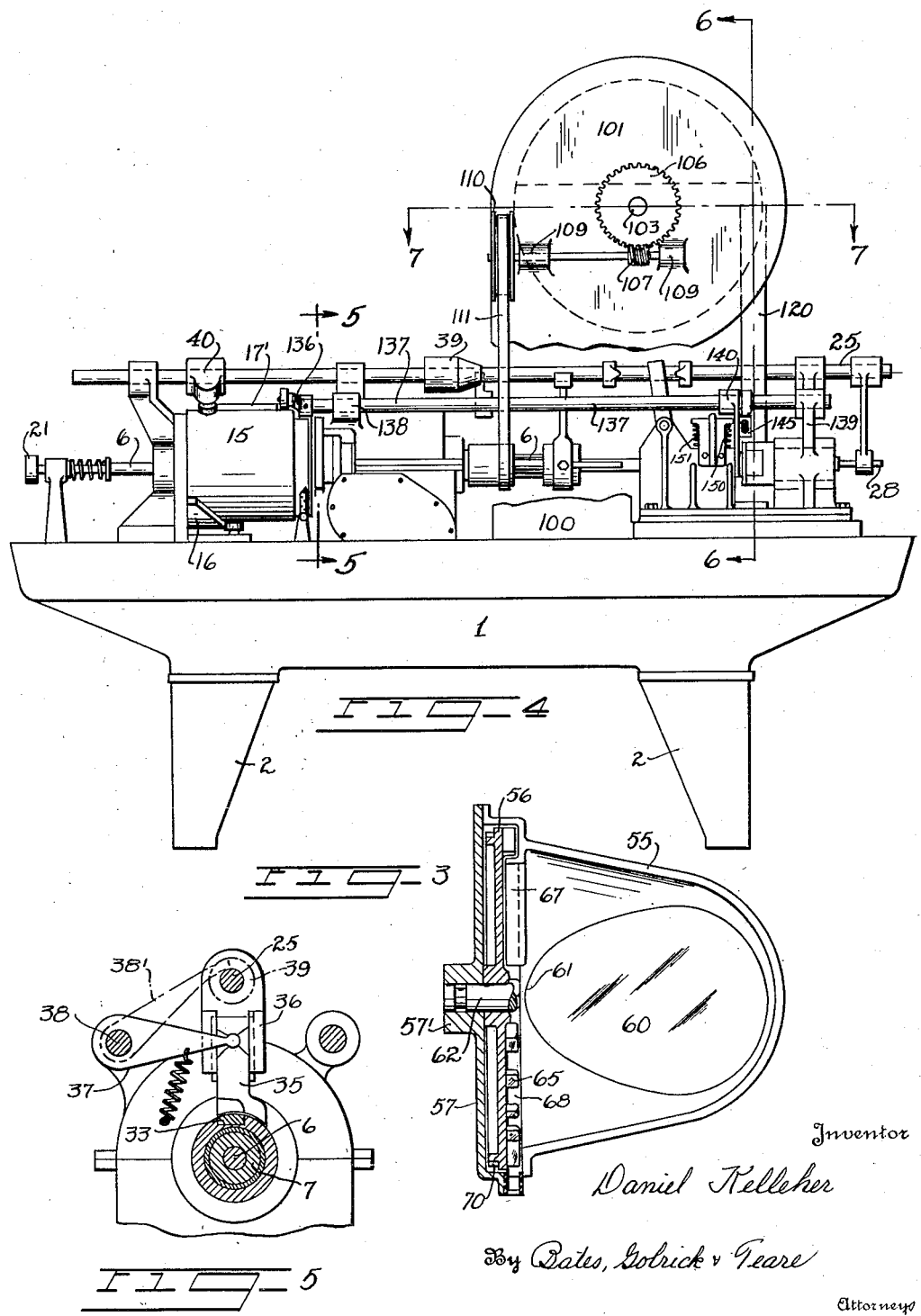

Sept. 12, 1933.   D. KELLEHER   1,926,048
WORK HANDLING MECHANISM
Filed March 25, 1929   6 Sheets-Sheet 4
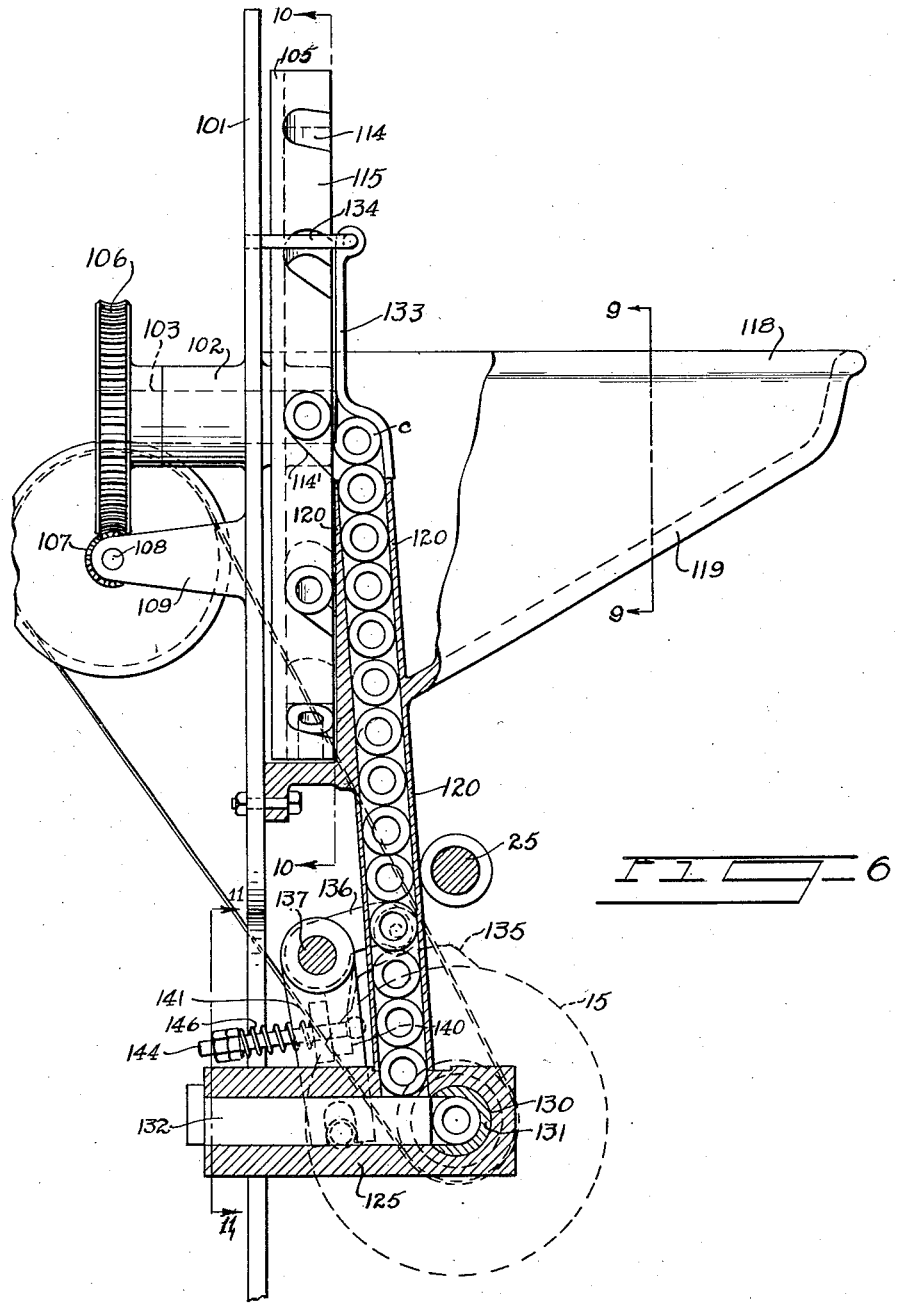
Inventor
Daniel Kelleher
By Bates, Golrick & Teare
Attorneys

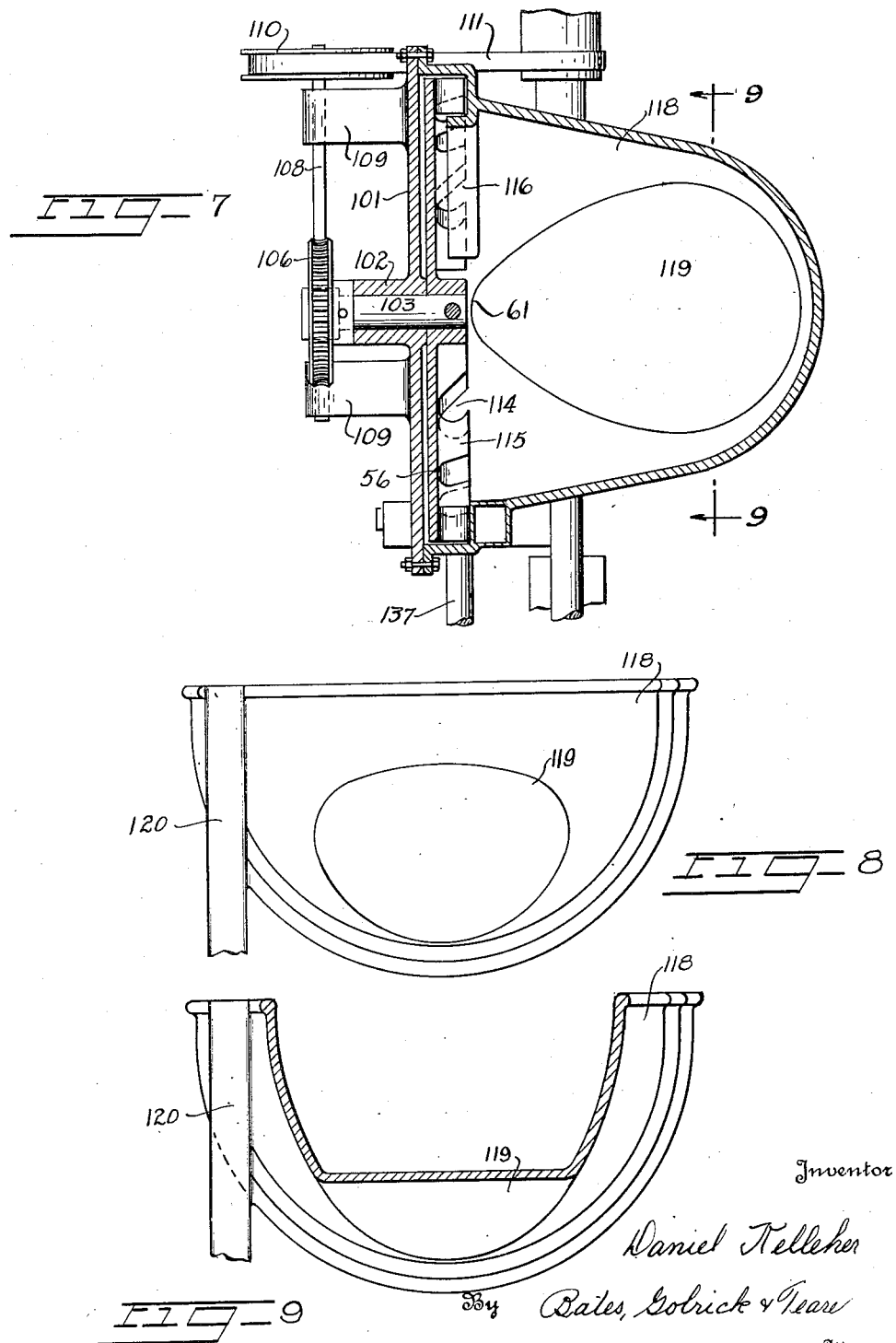

Sept. 12, 1933.　　　D. KELLEHER　　　1,926,048
WORK HANDLING MECHANISM
Filed March 25, 1929　　　6 Sheets-Sheet 6
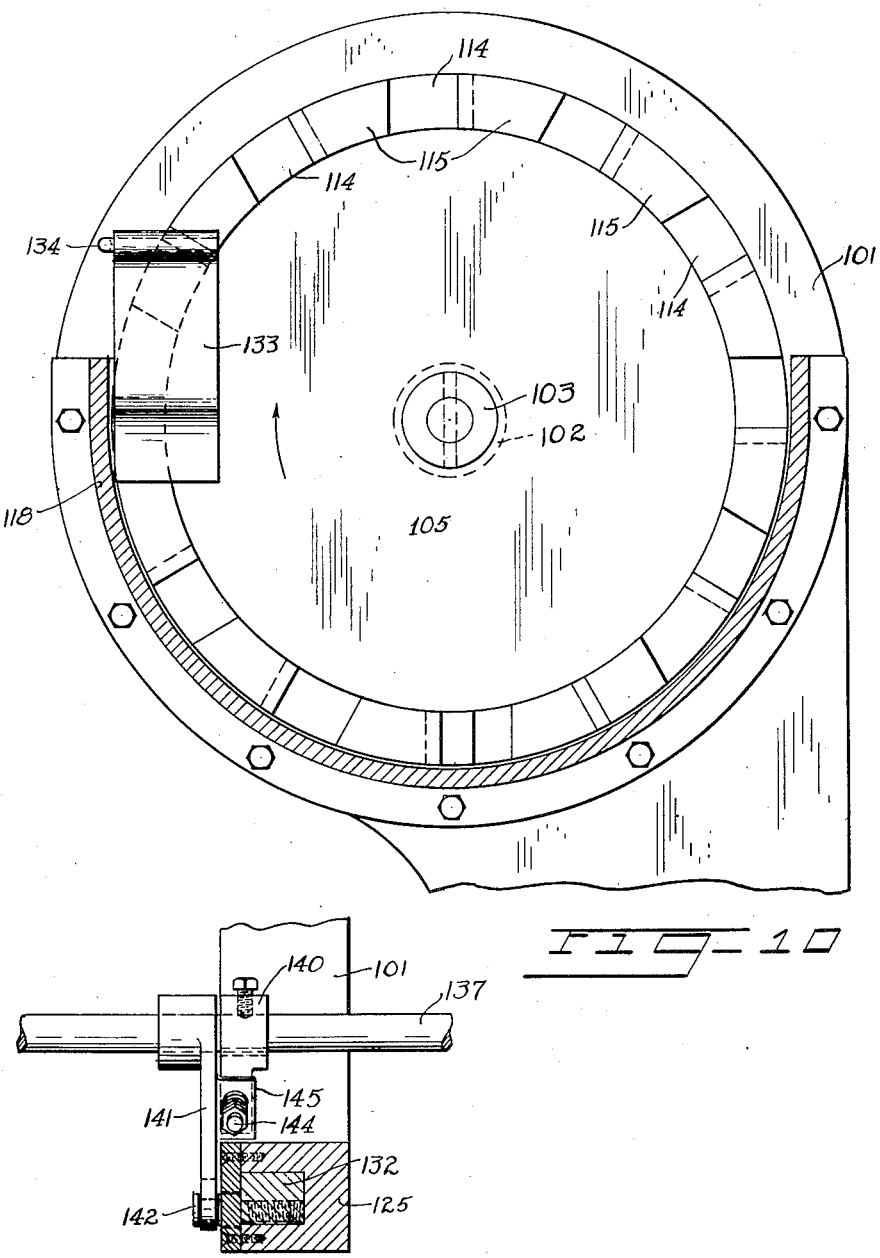
Inventor
Daniel Kelleher
By Bates, Gobrick & Teare
Attorneys Patented Sept. 12, 1933

1,926,048

UNITED STATES PATENT OFFICE 1,926,048

WORK HANDLING MECHANISM

Daniel Kelleher, Berea, Ohio

Application March 25, 1929. Serial No. 349,636

2 Claims. (Cl. 10—169)

This invention relates to blank arranging and feeding mechanism. The present application is a continuation in part of my application for U. S. Patent Serial No. 227,667, filed October 31st, 1927.

In the parent application a machine is shown adapted for tapping hexagonal nut blanks, and the blank arranging and feeding mechanism is therefore especially arranged to handle this type of blank. This application, in addition to the specific arrangement for feeding hexagonal blanks also includes a modification for handling conduit coupling blanks to be internally threaded, as by a tap.

An object of the invention is to provide a mechanism which will operate efficiently and accurately to arrange pieces of work for presentation to a tool.

A further object is to provide a hopper which shall be so arranged as to afford a large cubic content, which will at the same time be unusually light in weight and compact, and which will normally discharge every blank contained therein.

A further specific object is to provide a hopper mechanism by which nuts, conduits or the like may be supplied to a tool in ordered arrangement and in which the possibility of jamming by reason of disarrangement of the blanks is reduced to a minimum.

A further object is to provide a blank feeding mechanism which will operate to positively convey a blank from a single series of arranged blanks into definite cooperative relation to a tool.

Further objects and features of the invention will become apparent from the following description relating to the accompanying drawings. The essential characteristics are summarized in the claims.

In the drawings, Fig. 1 is an assembly sectional view of the machine embodying one form of the invention; Fig. 2 is a transverse cross sectional view as indicated by the line 2—2 on Fig. 1; Fig. 3 is a sectional plan view as indicated by the line 3—3 on Fig. 1; Fig. 4 is a side elevation of a machine embodying another form of the invention; Fig. 5 is a transverse cross sectional view as indicated by the line 5—5 on Fig. 4; Fig. 6 is a fragmentary cross sectional view as indicated by the line 6—6 on Fig. 4; Fig. 7 is a fragmentary cross sectional plan view as indicated by the line 7—7 on Fig. 4; Fig. 8 is an end elevation of the hopper or storage pan; Fig. 9 is a cross sectional view therethrough as indicated by the line 9—9 on Fig. 7; Fig. 10 is a transverse cross sectional fragmentary view as indicated by the line 10—10 on Fig. 6, and Fig. 11 is a detail view as indicated by the line 11—11 on Fig. 6.

For the purpose of more clearly understanding the character of work to be performed by the hopper mechanism, as well as to set out the cooperative relation between it and the work performing mechanism, I will briefly describe the elements of the tapping machine shown, referring particularly to Fig. 1.

The machine as shown comprises a base 1, forming an oil pan, supported on suitable legs 2. The work holder is generally designated 3 and has a bore extending longitudinally of the machine into which blanks are successively placed to be operated upon by the tool, shown as a tap T. The tap is intermittently engaged by a chuck which comprises a collett 5 drivingly rigid with a spindle shaft 6. The spindle shaft is splined within a spindle sleeve 7 supported in brackets 9 and 10. The spindle sleeve is arranged to be constantly driven by a worm gear 11 meshing with a worm 12 on a main driving shaft 13.

When the blanks are tapped, they are discharged from the machine over the shank of the tap, the spindle shaft 6 being longitudinally moved periodically to allow the collett 5 to disengage the tap shank.

The mechanism for causing intermittent engagement and disengagement of the tap includes a multiple face cam carried on a drum 15, rotatively arranged about the spindle sleeve on suitable bearings. The cam has oppositely positioned cam members 16 and 17 which act on the spindle shaft 6 through a slide bar 18, connecting member 19 and collars 20 and 21 on the spindle shaft. The cam is started in rotation by a main control rod 25 supported for longitudinal movement in the brackets 9 and 10 at one end, and in a bracket member 27 at the other. The control rod is primarily actuated by a sliding bar 28 in line with the tap, and connected to the control rod by a cross arm 29. The bar 28 is arranged to be engaged by the end of the tap as this is progressed a predetermined distance through a pair of blanks as at W, being tapped. The blanks are suitably retained in longitudinally fixed position in the bore of the holder 3 by any suitable latch arrangement, a periodically raised plunger 30 being shown as engaging between two pairs of blanks W and W'. Assuming the tap cuts right hand threads, the result of tapping will be to advance the tap toward the right, as viewed in Fig. 1. When the tap has advanced a sufficient distance to have substantially completed the tapping operation, the end of the tap pushes on the bar 28 which in turn pulls on the control rod 25, and this latter operation results in connecting the cam drum to the spindle sleeve.

The driving connection between the cam drum and the spindle sleeve may comprise a set of gears, one being shown at 31 rigid on the sleeve, and another being shown at 32 loose on the sleeve. 33 designates a latch slidably mounted in the drum and which is normally urged rearwardly (toward the left) by a spring 34 into engagement with clutch teeth (not shown) on the gear 32. Shifting of the control rod 25 forwardly results in raising a latch release member 35 to allow the latch 33 to engage the gear 32, thus causing the spindle driving mechanism to also drive the drum. Mechanism for periodically raising the latch release member 35 is shown in detail in my copending application, but herein I show the essential parts of this mechanism comprising a guideway 36, (Fig. 5) in which the member 35 is slidably mounted for reciprocation by an arm 37 on a rock shaft 38 running parallel to the control rod 25 and having an arm 38' for cooperation with a cone cam 39 fast on the control rod 25.

The cone cam acts to withdraw the latch release when a single complete tapping operation is finished and the ensuing rotation of the drum causes the withdrawal of the spindle shaft 6 from connection with the tap, stripping completed work from the tap shank and, by reason of an arm 40 on the control rod, the resetting of the control rod and feeding of a pair of blanks into the work holder.

It may be noted that at the time the latch release operates the cam 16 is positioned to move the bar 25 farther to the right, thus carrying the left hand end of the bar 28 beyond a pair of blanks positioned as at W² (Fig. 2) at the bottom end of a raceway 50, upon which these blanks drop into the bore of a work positioning guide 51 mounted on the bracket 27, into alignment with the bar 28 and the tap. As the resetting of the control rod 25 is subsequently effected by the cam 17 the bar 28 shoves these blanks into the work holder adjacent the plunger 30.

As the control rod is reset, the drum will be disconnected from its driving mechanism by the return of the latch control member 35 to down position. This is by reason of the fact that the lower end of the member 35 is a cam which on engagement of the latch pulls the latch from engagement with the gear 32. The drum now remains stationary during the tapping of the newly positioned blanks.

The specific form of hopper mechanism shown in the parent application is found herein in Figs. 1, 2 and 3. The hopper comprises in general the hopper pan 55, selecting disc 56 and supporting bracket 57, the latter being an upward extension of the bracket member 27, previously mentioned. The shape of hopper pan is important because it must be made to hold a large quantity of blanks, and must be certain to deliver every blank to the selecting disc. In order that the hopper shall be of large content in relation to the amount of material used to form it, it is made rounded, that portion of the hopper adjacent the selecting disc being conical, and the outer end, past the conical portion, being spherical. Now obviously, if the arrangement were a true cone and a true sphere, one joining the other, as indicated by the broken line 55' on Fig. 1, the hopper would not be sure to deliver its entire content of pieces because either the cubic content would have to be greatly reduced or one portion of the bottom would be at a less steep angle than the angle of repose of the pieces. In order not to change the general shape of the hopper mentioned, I flatten off the bottom, as at 60, the flat portion joining the rounded sides and end walls, as shown in Fig. 6, the contour of the flattened portion being substantially egg-shaped with the point lying close to the selecting disc, as at 61. The angle of repose of the pieces is less steep than the angle of the flattened portion 60, hence all pieces resting thereon will be delivered to the selecting disc.

The selecting disc rotates on a pin 62 which is mounted for free rotation in a boss 57' on the bracket 57. The disc turns in a clockwise direction, as viewed in Fig. 2. On the face of the disc, adjacent the hopper pan are a series of inwardly extending lugs 65 whose downward path of movement carries them behind an overhanging guard 67, (see Fig. 3), the guard preventing any of the lugs from dragging on the pile of blanks contained in the hopper pan until the lugs are in such position that the blanks once within the channels or recesses 68 between the lugs will remain there until properly discharged.

The channels 68 are tangentially arranged and wide enough to freely receive hexagonal blanks of the proportions shown, one blank substantially filling a single channel, as will be clear from Fig. 2. As a blank drops into a channel in righted position, and if it does not happen to be in a right position in the pile, it cannot drop in at all, this blank is prevented from moving outwardly by reason of the adjacent wall of the pan until the blank has been carried substantially to or past the position indicated by the broken line D in Fig. 2, at which point the blank rides over the edge of the pan wall as at 68 and drops into the raceway 50.

For driving the selecting disc, I provide ratchet teeth 70 on the backside of the disc 56, as shown particularly in Fig. 3, and coacting with these teeth are a pair of pawls 71 and 72. The pawls are reciprocated by reason of a shaft 73 supported, as shown in Fig. 1, by an overhanging bracket 74 carried by the member 57. The shaft may be rotated continuously by a belt 75 from the spindle sleeve 7. The pawls are coaxially mounted on an eccentric pin 76, hence, at every revolution of the shaft 73 the pawls are reciprocated once.

The diameter of the circle described by the axis of the pin 76 is substantially the equivalent of half a tooth 70. Hence, each pawl will move the disc a distance corresponding to half a tooth. It will be seen from Fig. 2 that on one rotation of the shaft 73 the pawl 71 will engage a tooth and carry it the distance of half its length, while the other pawl is left in a position midway between the ends of a tooth. On the next rotation the pawl 72 engages and carries the next tooth a distance of half a tooth. The result is a constant jogging of the disc 56 which jolts the nut blanks adjacent the disc into the recesses 68. The relation of a hexagonal nut blank to one of these recesses is shown in Fig. 2 where a nut blank, designated W³, has been carried by the rotation of the disc 56 to a position where the blank could drop into the mouth portion 78 of the raceway 50. The side walls of the recesses 68 are parallel to respective tangents of a circle described, about the axis of the disc 56. This is to produce the relation of these walls to the mouth 78 of the raceway shown, in which the walls slope down toward the raceway at an angle greater than the angle of respose of a blank. Even if some of the recesses should be left empty, the rotation of the disc is so timed that an adequate supply of blanks will be delivered to the raceway to keep it full at all times.

When at any time the raceway is completely filled, the surplus blanks carried in the recesses 68 are thrown back to the bottom of the hopper. The arrangement for accomplishing this comprises, as shown, a weighted deflector member 79 pivoted as at 80 to the bracket portion 57. This deflector has a curved lower end 81 which engages a nut blank, such as that indicated at W4, and which is prevented from feeding into the mouth of the raceway 50 because the raceway is full. In order to prevent jamming, the nut blank at W4 simply cams against the curved surface of the plate 81 raising the member against the gravitation of the weight 83, and forcing the blank W3 out of the recess back toward the hopper.

To hold the selector disc 56 against traveling backwardly by reason of being weighted only on one side by nut blanks traveling up toward the mouth of the raceway, at a time when the pawls are retracting from the teeth, I provide a pair of gravity pawls 85 and 86 having their working ends disposed in the same relation as those of the pawls 71 and 72.

In the form of hopper and feed arrangement, shown in Figs. 4 to 11 inclusive, two outstanding differences appear. One is that the lugs on the selecting disc provide radial channels for picking up the blanks from the hopper. Another is that the disc rotates in a plane parallel to the longitudinal axis of the machine rather than crosswise of this axis, as in the previously described form.

A further difference consists in controlling the feed of blanks from the bottom end of the raceway leading from the hopper by forcibly conveying blanks, one at a time, transversely of the raceway and transversely of the axis of the blanks, thus positively presenting them, one at a time, into substantially axial alignment with the tap, from which position they may be easily thrust into the work holder, as by a feed bar, such as 28, Fig. 4.

Referring to Figs. 4 and 6, a separate bracket 100 is provided to support the hopper pan and selecting disc. A circular portion 101 of the bracket is adapted to provide a bearing boss 102 for a shaft 103 rigid at one end with the selecting disc 105. In the case of feeding cylindrical blanks, it is not necessary to jog the disc as in handling hexagonal nut blanks because the cylindrical blanks roll easily. Consequently, in place of the ratchet jogging feed, I provide a worm gear 106 rigid on the shaft 103, and which meshes with a worm 107 on a shaft 108. The shaft is supported by brackets on ears 109 and is driven by a pulley 110 over which passes a belt 111, the belt being driven by the machine from the spindle head as before. The lugs 115 on the receptacle side of the selecting disc form channels 114 arranged to loosely receive the blanks C, and the direction of inclination of the channels is rearwardly with relation to the direction of rotation of the disc, (see Figs. 6 and 10). The lugs are prevented from contacting with pieces of work in the hopper pan as they travel downwardly toward the bottom thereof, by an overhanging ledge formation 116 on the hopper pan 118. The pan is flattened off as before on its bottom portion as at 119.

The raceway for leading blanks from the channels 114 comprises, as shown, a tube 120 leading from within the hopper downwardly past the bottom wall thereof and to a recessed bracket 125, the latter being the frame of a forcible conveying means for aligning the blanks with the tool. As the blanks are picked up by the disc 105 they lie with their axes in radial arrangement and are turned from whatever position they are picked up by the lugs to a substantially horizontal position, that is to say, with their axes horizontally disposed relative to the machine. In this position a blank has moved past the wall 128 of the tube 120, and is righted to roll down the inclined face 114' of the lug, see Fig. 6, into the raceway 120.

In the event that the disc overfeeds, or tends to overfeed the raceway tube, by reason of not taking away blanks from the end of the tube as fast as they tend to feed, these overfed blanks are simply allowed to roll down into the hopper as the disc continues to rotate. In the event of the blanks jamming at the point of discharge from the radial recesses into the tube, the jammed piece will be ejected out over the top of the tube past a swingable plate 130, pivoted as on an overhanging bar 131 on the bracket member 101.

An important feature of the present invention, shown particularly in Figs. 4, 6 and 11, is the arrangement whereby blanks initially fed as in a raceway or equivalent device are positively fed into true axial alignment with the cutting tool in timed relation to the relative movement between the tool and tool holder which brings these elements together. This is not found in the parent application above referred to, but is particularly useful in connection with the mechanism therein shown, though in fact, adaptable for use in connection with any blank feeding and cutting mechanism of the general type of machine described in the parent application. While the device is shown only in connection with the arrangement adapted for handling cylindrical work blanks, it is to be understood that with some modification it is just as applicable to mechanism for handling hexagonal or square blanks for example.

The machine shown in Fig. 4 is particularly adapted for operation on conduit blanks, and details of the machine not clearly shown therein may be found in my prior Patent No. 1,645,285, issued October 11, 1927. The operation is substantially the same as that above described with reference to Figs. 1 and 2, the corresponding parts being similarly numbered.

The positive work positioning mechanism includes the member 125 which has a bore 130 parallel to the longitudinal axis of the machine, and the bore has a guide bushing 131 therein, the latter being open toward the left (Fig. 6) to receive the blanks. The work positioning bar 28 reciprocates within the bushing. Mounted in the member 125 and positioned opposite the open side of the bushing is a slide bar 132, the top edge of which is arranged to close the bottom end of the tube 120 when in the position shown. The bar is withdrawn from this position once for each complete tapping cycle of the machine, allowing the foremost blank to drop into the slideway of the bar, and be thrust into the bushing by the bar as this is returned.

Tapping may be effected without further movement of the blank by providing suitable jaws within the bushing 131 (not shown) or the blank may be moved along or out of the bushing as by the bar 28 to jaws such as shown in my prior patent, the positions of which are indicated in Fig. 4 at 150 and 151.

The mechanism for reciprocating the bar 132 includes an eccentric cam on the cam drum 15, the contour of which is shown in broken lines at 135 in Fig. 6. This cam acts on an arm 136 on a rock shaft 137 supported in brackets or ears 138 and 139. The rock shaft has a depending arm 140 fast on the shaft, and alongside this, and loose on the shaft, is another arm 141 having a pin and slot connection at 142 with the bar 132. The two arms are connected by a swingable bolt 144 anchored at one end to the arm 140 and passing loosely through an ear 145 on the arm 141. An adjustable compression spring 146, embracing the bolt, tends to hold the arms in the relation shown in Fig. 6.

During the tapping operation the cam follower arm rides on the cylindrical surface of the cam drum, but after a conduit is finished, and the advancing tap causes the cam to be picked up by the driving gearing, as above described, the cam 135 is moved past the cam follower, causing the bar 132 to be positively withdrawn from beneath the foremost blank in the raceway, and then causing the bar to move this blank into the bushing 131 just before the feed bar 28 makes its leftward stroke to carry a blank to the tap. Should a blank be jammed in the slideway, the spring 146 would give to avoid breakage, but otherwise, the feed of a blank from its position in the end of the raceway into alignment with the tap is positive. It will be understood that as the cam 135 is on the same cam drums which supports the cams 16 and 17, the operation of the cam 135 in positively bringing a blank into alignment with the tap will aways be completed before the end of the bar 28 reaches the position of the blank; or in case the blank is to be tapped in this position, then before the tap advances to tapping position.

I claim:

1. A feeding mechanism for work, comprising a hopper having a depressed arcuate channel at one end thereof, a rotatable disc forming the end wall of said hopper and having its periphery extending into said channel, said disc being provided with an arcuate flange having a series of slots extending from the inner periphery of the flange to the outer periphery thereof, and wherein the inner periphery of said flange is substantially a continuation of the side and bottom walls of the hopper, and a discharge passageway communicating with said channel.

2. A feeding mechanism for work, comprising a hopper having a depressed arcuate channel at one end thereof, a rotatable disc forming an end wall of the hopper and having its periphery extending into said channel, said disc being provided with an arcuate flange having a series of slots extending from the inner periphery of the flange to the outer periphery thereof, the inner periphery of said flange being arranged to be substantially a continuation of the side and bottom walls of the hopper, a passageway extending substantially tangential from the disc and downwardly from a horizontal plane substantially passing through the axis of said disc and arranged to receive work from said slots, a guard arranged within the hopper adjacent the side thereof opposite said passageway, said guard comprising a rigid arcuate lip extending from the wall of the hopper toward the disc and overlying the inner periphery of said flange, means to rotate the disc to cause the slots to progress downwardly from the guard and upwardly toward the entrance to the discharge passageway.

DANIEL KELLEHER.